(12) United States Patent
Gu et al.

(10) Patent No.: US 10,889,704 B2
(45) Date of Patent: Jan. 12, 2021

(54) HALOGENATED ELASTOMERS WITH MOONEY VISCOSITY STABILITY AND METHOD FOR PREPARING SAME

(71) Applicant: ExxonMobil Chemical Patents Inc., Baytown, TX (US)

(72) Inventors: Leming Gu, Pearland, TX (US); Thomas R. Barbee, Kingwood, TX (US); Joel E. Schmieg, Sugar Land, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 174 days.

(21) Appl. No.: 15/938,012

(22) Filed: Mar. 28, 2018

(65) Prior Publication Data
US 2018/0334555 A1 Nov. 22, 2018

Related U.S. Application Data (60) Provisional application No. 62/509,270, filed on May 22, 2017.

(51) Int. Cl.
| | | |
|---|---|---|
| *C08F 6/14* | (2006.01) | |
| *C08F 6/20* | (2006.01) | |
| *C08F 8/32* | (2006.01) | |
| *C08K 5/3435* | (2006.01) | |
| *C08L 15/02* | (2006.01) | |
| *B60C 1/00* | (2006.01) | |
| *C08K 5/00* | (2006.01) | |

(52) U.S. Cl.
CPC ............ *C08L 15/02* (2013.01); *B60C 1/0008* (2013.01); *C08K 5/005* (2013.01); *C08L 2201/08* (2013.01)

(58) Field of Classification Search
CPC ....... B60C 1/0008; C08K 5/005; C08L 15/02; C08L 2201/08
See application file for complete search history.

(56) References Cited

U.S. PATENT DOCUMENTS

| | | |
|---|---|---|
| 5,569,723 A | 10/1996 | Baade et al. |
| 5,681,901 A | 10/1997 | Newman |
| 6,552,108 B1 | 4/2003 | Wang et al. |

FOREIGN PATENT DOCUMENTS

| | | |
|---|---|---|
| JP | 2005171153 A | 6/2005 |
| WO | 2004/035671 A | 4/2004 |
| WO | 2004/074364 A | 9/2004 |
| WO | 2015/130391 A | 9/2015 |
| WO | 2016/053594 A | 4/2016 |

OTHER PUBLICATIONS

Capocci, G. et al., "A Radically New UV Stabilizer for Flexible PVC Roofing Membranes", Journal of Vinyl & Additive Technology, vol. 11, pp. 91-94 (2005).
U.S. Appl. No. 61/946,018, filed Feb. 28, 2014.
U.S. Appl. No. 61/946,035, filed Feb. 28, 2014.
U.S. Appl. No. 62/057,392, filed Sep. 30, 2014.

*Primary Examiner* — Irina S Zemel
*Assistant Examiner* — Jeffrey S Lenihan (57) ABSTRACT

Methods of improving Mooney stability of a brominated elastomer comprising: neutralizing a brominated elastomer effluent with a neutralizing agent and water to form a neutralized effluent comprising a hydrocarbon solvent; removing the solvent from the neutralized effluent to form a brominated elastomer slurry; and separating a brominated elastomer from the brominated elastomer slurry, wherein a Mooney stabilizer package comprising an amine-functional hindered amine stabilizer (HAS) and an acid scavenger can be added, together or separately, before the removing step are provided herein. The acid scavenger can comprise a protonatable atom with a pKa greater than the pKa of the HAS nitrogen atom. The separated brominated elastomer can have a delta Mooney of not more than about 10 Mooney units after ~7 days at ~80° C. Stabilized brominated elastomer compositions can be made using this method, and articles can be made from those compositions.

17 Claims, 4 Drawing Sheets

HALOGENATED ELASTOMERS WITH MOONEY VISCOSITY STABILITY AND METHOD FOR PREPARING SAME

CROSS-REFERENCE TO RELATED APPLICATIONS

This application claims priority to U.S. Ser. No. 62/509,270, filed May 22, 2017, herein incorporated by reference.

FIELD

The present disclosure relates to stabilizing brominated elastomers against their tendency to increase viscosity over time. Methods of stabilizing and stabilized compositions are described herein

BACKGROUND

The regenerative halogenation process is accomplished by contacting a polymer, which has been dissolved in a solvent, a halogenating agent, and an emulsion. The halogenating agent includes but is not limited to molecular bromine, bromine chloride, hydrogen bromide, sodium bromide, or a mixture thereof. The emulsion is a mixture of a water soluble oxidizing agent capable of converting hydrogen halide to a free halogen, an emulsifying agent, an organic solvent, and water. The halogenated polymer is separated from the mixture. More information about known regenerative halogenation processes is disclosed, for example, in U.S. Pat. Nos. 5,681,901 and 5,569,723.

While halogenated polymers manufactured using the regenerative process yield a greater maximum theoretical halogenation utilization compared to conventional halogenation methods, the regenerative process results in increased levels of Mooney viscosity growth of the polymers when compared with polymers halogenated by conventional methods. Mooney viscosity growth, or Mooney growth, can lead to unsatisfactory processability of compound formulations, such as inner liner formulations. Unlike bromobutyl polymers, chlorobutyl polymers generally do not experience the same degree of increasing Mooney viscosity as bromobutyl polymers due to the greater bonding strength of chlorine and the associated backbone carbon, as compared to bromine, to the polymer structure. Virtually all bromobutyl polymers undergo some degree of increase in the Mooney viscosity as the polymer ages. For bromine-regenerative-produced bromobutyl, the slope of the increase in Mooney viscosity is even greater. For instance, Mooney viscosity growth of polymers prepared by regeneration is about twice that of polymers prepared by conventional methods stored in warehouse conditions for about 2.5 years (approximated by an Oven Aging Test described later herein). While a small increase in polymer Mooney viscosity may not negatively alter the products made using the polymer, or alter any manufacturing processes using the polymer, accelerated Mooney viscosity growth reduces the shelf life of the halogenated polymer.

U.S. Ser. No. 61/946,018, filed on Feb. 28, 2014, discloses adding free radical scavengers to the final polymers produced by the conventional and bromine regeneration processes to suppress the Mooney viscosity growth. U.S. Ser. No. 61/946,035, filed on Feb. 28, 2014, discloses adding an ionomer stabilizer to the final elastomeric nanocomposite to suppress the Mooney growth. U.S. Ser. No. 62/057,392, filed on Sep. 30, 2014, discloses adding a sterically hindered nitroxyl ether or radical or a hindered hydroxyphenyl antioxidant to suppress the Mooney viscosity growth.

There is still a desire to modify the regenerative halogenation process known in the art whereby the resulting polymer has a reduced Mooney viscosity growth and therefore an extended shelf life.

SUMMARY

This section provides a general summary of the disclosure, and is not a comprehensive disclosure of its full scope or all of its features.

One aspect of the invention involves a method of improving Mooney stability of a brominated elastomer. The method can comprise the steps of: neutralizing a brominated elastomer effluent with a neutralizing agent and water to form a neutralized effluent comprising a hydrocarbon solvent; removing the solvent from the neutralized effluent to form a brominated elastomer slurry; and separating a brominated elastomer from the brominated elastomer slurry. Advantageously, a Mooney stabilizer package comprising (at least about 300 wppm of) an amine-functional hindered amine stabilizer (HAS) and (at least about 800 wppm of) an acid scavenger can be added, together or separately, before the removing step, e.g., i) to the brominated elastomer effluent prior to neutralizing; ii) when neutralizing the brominated elastomer effluent; or iii) to the neutralized effluent prior to removing the hydrocarbon solvent (preferably at least at iii)). The amine-functional HAS can comprise an HAS nitrogen atom having a first pKa, and the acid scavenger can comprise a protonatable atom (such as a Lewis acid atom, e.g., a nitrogen atom) with a pKa greater than the pKa of the HAS nitrogen atom. Additionally or alternatively, the separated brominated elastomer can have an aged Mooney viscosity of not more than about 10 Mooney units higher than an initial Mooney viscosity of the separated brominated elastomer.

Another aspect of the invention involves an article made from the brominated elastomer prepared by the methods disclosed herein. In some embodiments, the article can be a tire innerliner or a tire bladder or can be incorporated as a layer into a tire, a bladder, a hose, a belt, a pneumatic spring, or a vehicle body mount.

Still, another aspect of the invention involves a brominated elastomer composition that is stabilized against undue Mooney viscosity growth. Such a brominated elastomer composition can comprise: a copolymer made from a $C_4$ to $C_7$ isomonoolefin and at least one monomer or polymerizable unit selected from isoprene and alkylstyrene; and a Mooney stabilizer additive comprising (or consisting essentially of) an amine-functional hindered amine stabilizer (HAS) and an acid scavenger (optionally but preferably wherein the amine-functional HAS comprises an HAS nitrogen atom having a first pKa and the acid scavenger comprises a protonatable atom, for example a Lewis acid atom such as a nitrogen atom, with a pKa greater than the pKa of the HAS nitrogen atom). In some embodiments, the brominated elastomer composition can have an initial Mooney viscosity no more than about 8 Mooney units lower than an aged Mooney viscosity after being subject to 80° C. for seven days. In cases where the protonatable atom is a nitrogen atom, the acid scavenger can be an amine-functional acid scavenger. Additionally or alternatively, the brominated elastomer composition can further comprise 0.001 to 0.2 mol % of an allylic alcohol.

Yet another aspect of the invention involves an oxidatively-stable brominated elastomer composition where an added Mooney growth stabilizing additive package is in its active/oxidized form. The oxidatively-stable brominated elastomer composition can comprise: a copolymer made from a $C_4$ to $C_7$ isomonoolefin and at least one monomer or polymerizable unit selected from isoprene and alkylstyrene; and an oxidized Mooney stabilizer additive comprising an oxidized nitroxy-functional hindered amine stabilizer (HAS) and an acidified quaternary ammonium. In some embodiments, the brominated elastomer composition can have an initial Mooney viscosity no more than about 8 Mooney units lower than an aged Mooney viscosity after being subject to 80° C. for seven days. In cases where the protonatable atom is a nitrogen atom, the acid scavenger can be an amine-functional acid scavenger. Additionally or alternatively, the brominated elastomer composition can further comprise 0.001 to 0.2 mol % of an allylic alcohol.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

An aspect of the present invention involves a method for eliminating or inhibiting Mooney viscosity growth (alternatively described as increasing Mooney viscosity stability) over a period of time, which can often occur in halogenated (brominated) polymers, particularly those made using a regenerative halogenation (bromination) process. Due to labile bonds within, and/or due to unquenched active sites within or surrounding, a polymer structure, virtually all polymers experience occasional side reactions such as inter-chain coupling, through which reactions the polymer molecular weight can increase with time and optionally with increased temperature. These side reactions can produce both larger polymer chains and smaller polymer chains. However, because viscosity is affected disproportionally more by larger chains than by smaller chains, coupling reactions that increase polymer molecular weight can result in significant increases in Mooney viscosity. Larger polymer chains, such as those formed through coupling, can also disproportionally affect the Z-average molecular weight (Mz) and the weight average molecular weight (Mw) and can alter the molecular weight distribution (MWD).

As noted herein, the increase (growth) in Mooney viscosity over time can typically be greater for brominated polymers prepared by known bromine regenerative processes than for conventionally brominated polymers. Thus, an aspect of the present invention can involve stabilizing a halogenated (brominated) polymer produced using a regenerative halogenation (bromination) process by using a particular Mooney stabilizer additive package (e.g., a synergistic combination of components). The halogenated (brominated) polymer can have a relatively low Mooney viscosity growth over a defined period of time by incorporating a particular Mooney stabilizer additive package (e.g., a synergistic combination of components). In some embodiments, the Mooney viscosity growth over time can be comparable to a conventionally halogenated (brominated) polymer. In some embodiments, the Mooney viscosity growth over time can be below a desired or predetermined amount of Mooney units. In some embodiments, the Mooney viscosity growth over time with a particular Mooney stabilizer additive package (e.g., a synergistic combination of components) can be at least a certain percentage below that without any stabilizing additives.

Definitions

For purposes of this invention and the claims hereto, the numbering scheme for the Periodic Table Groups is according to the IUPAC Periodic Table of Elements.

The term "and/or" as used in a phrase such as "A and/or B" herein is intended to include "A and B," "A or B," "A," and "B."

The terms "substituent," "radical," "group," and "moiety" may be used interchangeably.

As used herein, and unless otherwise specified, the term "$C_n$" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds; (ii) unsaturated hydrocarbon compounds; and (iii) mixtures of hydrocarbon compounds (saturated and/or unsaturated), including mixtures of hydrocarbon compounds having different values of n.

The term "ring atom" means an atom that is part of a cyclic ring structure. By this definition, a benzyl group has six ring atoms and tetrahydrofuran (THF) has 5 ring atoms. As noted by reference to THF, ring atoms need not be only carbon atoms—they can include one or more heteroatoms such as N, O, and/or S. When a cyclic ring structure contains only a singular heteroatom or only one instance each of more than one type of heteroatom, the heteroatom can described by the ring name, even if the cyclic structure has a substituted ring structure. For example, the furanyl oxygen describes the sole oxygen in the THF ring; the piperidinyl nitrogen describes the sole nitrogen in a piperidinyl ring; and the morpholinyl nitrogen and the morpholinyl oxygen describe the sole nitrogen and the sole oxygen, respectively in a morpholinyl ring. However, because of the ambiguity, it would not be proper to characterize either of the two nitrogens in a piperazinyl ring as "the piperazinyl nitrogen."

For purposes of this invention and claims thereto, unless otherwise indicated, the term "substituted" means that a hydrogen group has been replaced with a heteroatom, or a heteroatom containing group. For example, a "substituted hydrocarbon" is a hydrocarbon made of carbon and hydrogen where at least one carbon (and attendant hydrogen(s)) and/or at least one hydrogen is replaced by a heteroatom or heteroatom containing group.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

Unless otherwise indicated, where isomers of a named group exist (for alkyl, e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an isomeric group without specifying a particular isomer (e.g., butyl) expressly discloses all isomers (e.g., n-butyl, iso-butyl, sec-butyl, and tert-butyl).

The term "polymer" is used herein to refer to homopolymers, copolymers, interpolymers, terpolymers, etc. Likewise, a copolymer may refer to a polymer comprising at least two monomers, optionally with other monomers. A "homopolymer" is a polymer having all mer units that are the same. A "copolymer" is a polymer having two or more types of mer units that are distinct or different from each other. A "terpolymer" is a polymer having three types of mer units that are distinct or different from each other. "Distinct" or "different," as used to refer to types of mer units, indicates that the mer units differ from each other by at least one atom or are different isomerically. Accordingly, the definition of copolymer, as used herein, includes terpolymers and the like. When a polymer is referred to as comprising a monomer, the monomer is present in the polymer in the polymerized form of the monomer or in the polymerized form of a derivative from the monomer (i.e., a monomeric unit). However, for ease of reference, the phrase "comprising [the respective] monomer" or the like is used herein as shorthand.

As used herein, the term "elastomer" refers to any polymer or blend of polymers consistent with the ASTM D1566 definition: "a material that is capable of recovering from large deformations, and can be, or already is, modified to a state in which it is essentially insoluble, if vulcanized, (but can swell) in a solvent." Elastomers are often also referred to as rubbers; the term elastomer may be used herein interchangeably with the term rubber. For various reasons, preferred elastomers can typically have a melting point that is not measurable by Differential Scanning Calorimetry (DSC) or, if measurable by DSC, that is less than 40° C. (such as less than 20° C. or less than 0° C.). Additionally or alternatively, preferred elastomers can typically have a glass transition temperature (Tg) of about −50° C. or less, as measured by DSC.

Mooney viscosity is used herein to characterize elastomers/rubbers. Mooney viscosity is tested by measuring the shearing torque resisting rotation of a cylindrical metal disk (or rotor) embedded in a sample within a cylindrical cavity. The dimensions of the shearing disk viscometer, test temperatures, and procedures for determining Mooney viscosity are defined in ASTM D1646. Mooney viscosity is measured in Mooney units and reported herein as ML 1+8 at 125° C. As used herein, the "initial Mooney viscosity" of a sample, such as a halogenated elastomer composition, is the Mooney viscosity measured immediately after a sample is made, when a sample is received, or at any time from which viscosity progression is desired to be measured. As used herein, the "aged Mooney viscosity" of a sample is the Mooney viscosity measured after the sample has been subject to an aging process for a set time period and, if applicable, at a temperature above ambient. In this application, aged Mooney viscosity is measured after exposure of a sample to about 80° C. for approximately 7 days after measurement of the initial Mooney viscosity. Further as used herein, a "delta Mooney" or a "delta Mooney viscosity" is the difference between an aged Mooney viscosity and an initial Mooney viscosity. Without being bound to theory, it is believed that there can often be a time-temperature correlation for aged Mooney viscosity, such that aging at a lower temperature for a longer time can be roughly equivalent to aging at a higher temperature for a shorter time. For example, it is believed that an aged Mooney viscosity measured after approximately 7 days' exposure to about 80° C. can be roughly equivalent to that measured after approximately 21 months' exposure to about 33° C.

As used herein, the term "isoolefin" refers to any olefin monomer having at least one carbon having two substitutions on that carbon. As used herein, the term "multiolefin" refers to any monomer having two (i.e., "diolefin") or more double bonds (e.g., "triolefin," etc.). In some embodiments, the multiolefin is any monomer comprising at least two conjugated double bonds, such as a conjugated diene (like isoprene).

The phrases "isobutylene based elastomer" or "isobutylene based polymer" refer to elastomers or polymers comprising at least 70 mol % repeat units from isobutylene. Further, the term "butyl" is used interchangeably with the phrase "isobutylene based" herein.

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, OH (or —OH) is hydroxyl, and RT is room temperature (and is about 20° C. to about 25° C., unless otherwise indicated).

Base Elastomers

Elastomeric polymers that can benefit (or benefit most) from the Mooney growth stabilization described herein can include elastomers derived from a mixture of monomers, the mixture having at least (1) a $C_4$ to $C_7$ isoolefin monomer component with (2) at least one multiolefin or other polymerizable monomer component. The isoolefin can be present in an amount ranging from 70 to 99.5 wt % (e.g., from 85 to 99.5 wt %) of the total monomers in any embodiment. The multiolefin derived or other polymerizable monomer component can be present in an amount ranging from 30 to about 0.5 wt % (e.g., from 15 to 0.5 wt % or from 8 to 0.5 wt %) in any embodiment.

The isoolefin can be a $C_4$ to $C_7$ compound, non-limiting examples of which can include compounds such as isobutylene, 2-methyl-1-butene, 3-methyl-1-butene, 2-methyl-2-butene, 1-butene, 2-butene, methyl vinyl ether, indene, vinyltrimethylsilane, hexene, and/or 4-methyl-1-pentene. The multiolefin can be a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and/or piperylene. Other polymerizable monomers such as styrene and dichlorostyrene are additionally or alternatively suitable for homopolymerization or copolymerization in polymerized isoolefin (butyl) rubbers.

Preferred elastomers useful in the practice of this invention can include isobutylene-based copolymers. As stated above, an isobutylene based elastomer or a polymer refers to an elastomer or a polymer comprising at least 70 mol % repeat units from isobutylene and at least one other polymerizable unit. These polymers are also conventionally referred to as butyl rubbers. One butyl rubber polymer useful in the invention can be obtained by reacting isobutylene with 0.5 to 8 wt % isoprene (e.g., 0.5 to 5.0 wt % isoprene), with the remaining weight percent of the polymer being derived from isobutylene.

Other elastomeric polymers of the present invention can be derived from at least one random copolymer comprising a $C_4$ to $C_7$ isoolefin and an alkylstyrene comonomer. The isoolefin may be selected from any of the above listed $C_4$ to $C_7$ isoolefin monomers, and can advantageously be an isomonoolefin (in a preferred embodiment, isobutylene). The alkylstyrene may comprise or be para-methylstyrene, containing at least 80% (e.g., at least 90% or at least 95%) by weight of the para-isomer, and the elastic polymer can optionally also include another functional monomer. The random copolymer can have at least one or more of the alkyl substituents groups present in the styrene monomer units. In any embodiment, the elastomer can comprise random polymers of isobutylene and 0.5 to 20 mol % para-methylstyrene.

In any embodiment of the invention, other useful elastomers can include other unsaturated copolymers of isoolefins. Non-limiting examples of such unsaturated polymers can include poly(styrene-co-butadiene), star-branched isobutylene-isoprene, star-branched isobutylene-p-methylstyrene, isobutylene-isoprene-alkylstyrene block polymers, random polymers of isobutylene-isoprene-alkylstyrene, and combinations and copolymers thereof.

The above polymers may be produced by any suitable means known in the art, and the invention is not herein limited by the method of producing the polymer. The polymers are traditionally produced in either a slurry polymerization process or a solution polymerization process. If the polymer is produced in a slurry polymerization process whereby the polymer precipitates out of the reaction medium, then the polymer can be dissolved into a suitable solvent (i.e., creating a polymer cement), e.g., prior to halogenation. For polymers produced via a solution process, after removal of unreacted monomers and removal or neutralization of unused catalysts, the same polymer containing solution, or polymer cement, may be used for halogenation. The polymer cement can contain 1 to 70 wt % polymer (e.g., 10 to 60 wt % polymer, 10 to 50 wt % polymer, or 10 to 40 wt % polymer).

Method of Preparing Halogenated Elastomers

One method of preparing bromobutyl elastomers via bromine regeneration is described in detail in U.S. Pat. No. 5,670,582. Isobutylene based polymers having unsaturation in the polymer backbone, such as isobutylene-isoprene polymers, may be readily halogenated using an ionic mechanism during contact of the polymer with a halogen source, e.g., molecular bromine or chlorine, and at temperatures in the range of from about 20° C. to 80° C. Isobutylene based polymers having no unsaturation in the polymer backbone, such as isobutylene-alkylstyrene polymers, can undergo halogenation under free radical halogenation conditions, i.e., in the presence of white actinic light or by inclusion of an organic free radical initiator in the reaction mixture, and at temperatures of 20° C. to 90° C.

Regenerative halogenation processes can occur by contacting a polymer solution with a halogenating agent and an emulsion containing an oxidizing agent. The oxidizing agent can interact with hydrogen halide created during halogenation, converting the halogen back into a form useful for further halogenation of the polymer thereby improving the halogen utilization.

Figure 1:
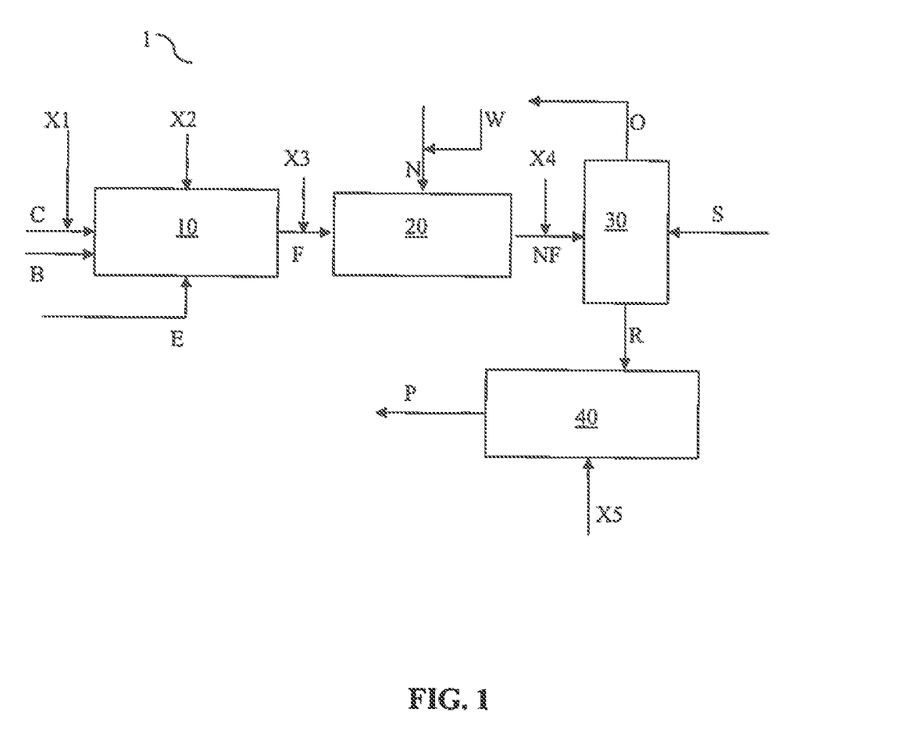
FIGS. 1 and 2 show two variations in regenerative halogenation processes for making elastomer compositions according to the invention.

One embodiment of a regenerative bromination process 1 is illustrated in FIG. 1. Polymer cement is fed per feedstream C into a bromination unit 10. The bromination unit 10 may be any conventional means permitting the desired reaction; it may be a mixed flow stirred tank, a conventional stirred tank, a packed tower, or a pipe with sufficient flow and residence time to permit the desired reaction to occur. The halogenating agent, in the form of molecular bromine, bromine chloride, hydrogen bromide, sodium bromide, or a mixture thereof is fed per feedstream B into the bromination unit 10.

An emulsion is fed per feedstream E into the bromination unit 10. The emulsion can include or be composed of the oxidizing agent, water, solvent, and an emulsifying agent, such as a surfactant. The emulsion is prepared by providing a 10 to 80 wt % (e.g., a 20 to 70 wt % or 25 to 45 wt %) solution of the oxidizing agent in water and mixing this with a solvent and an emulsifying agent under suitable mixing conditions to form a stable emulsion. The emulsion may be achieved by mixing the aqueous phase into the emulsifying agent containing solvent, or by mixing the oxidizing agent with the emulsifying agent first and then combining with the solvent. The amount of oxidizing agent can be in the range of 0.1 to 3 moles (e.g., 0.25 to 3 moles or 0.5 to 3 moles) of active oxidizing agent per mole of halogenating agent. Use of an oxidizing agent during bromination can increase bromine utilization to about 70 to 85%.

Oxidizing agents useful in the process can include materials which contain oxygen, preferably water soluble oxygen containing agents. Suitable agents can include peroxides and peroxide forming substances as exemplified by the following substances: hydrogen peroxide, organic hydrogen peroxide, sodium chlorate, sodium bromate, sodium hypochlorite or bromite, oxygen, oxides of nitrogen, ozone, urea peroxidate, acids such as pertitanic perzirconic, perchromic, permolybdic, pertungstic, perunanic, perboric, perphosphoric, perpyrophosphoric, persulfates, perchloric, perchlorate and periodic acids. Of the foregoing, hydrogen peroxide and hydrogen peroxide-forming compounds, e.g., per-acids and sodium peroxide, have been found to be highly suitable for carrying out the desired halogen regeneration.

The choice of solvent for the emulsion may be any solvent suitable for use or used in forming the polymer cement; in one embodiment, the solvent is selected to be the same solvent used to form the polymer cement. Suitable solvents include hydrocarbons such as pentane, hexane, heptane, and the like, inert halogen containing hydrocarbons such as mono-, di-, or tri-halogenated $C_1$ to $C_6$ paraffinic hydrocarbon or a halogenated aromatic hydrocarbon such as methyl chloride, methylene chloride, ethyl chloride, ethyl bromide, dichloroethane, n-butyl chloride, and monochlorobenzene or mixtures of the hydrocarbon and inert halo-hydrocarbon solvent. Furthermore, the solvent may be any combination of the solvents provided herein, including isomers thereof. In a particular embodiment, the solvent can comprise pentane, hexane, heptane, cyclohexane, cyclopentane, mono-, di-, or tri-halogenated $C_1$ to $C_6$ paraffinic hydrocarbon, or a combination thereof.

The emulsion via feedstream E may be introduced into the bromination unit 10 at the beginning of the halogenation cycle or after consumption of the bromine via halogenation of the polymer has begun. The bromination reaction and the bromine regeneration reaction can occur in the range of 20° C. to 90° C. for a time sufficient to complete bromination of the polymer. When molecular bromine is the halogenating agent introduced via feed stream B, bromine consumption is indicated by a color change of the reaction mixture from a reddish brown to a light tan or amber color. Following sufficient reaction time in the bromination unit 10, the bromination effluent, stream F, exiting the bromination unit 10, is neutralized by blending the effluent stream F with a neutralization feed stream N, optionally comprising dilution water W, in a neutralization unit 20. Heat is neither introduced nor removed from the effluent F prior to neutralization and any change in temperature of the stream is due to the heat of reaction of neutralization. In some embodiments, heat may be introduced or removed prior to neutralization.

The neutralized effluent stream exiting the neutralization unit 20, NF, is sent to a slurry (or flash) tank 30 to separate the polymer from the neutralized effluent in which the now-brominated polymer remains dissolved therein. In an embodiment, multiple slurry (or flash) tanks can be present in this stage of the process and may be operated in series or in parallel. Steam S, at temperatures from 120° C. to 200° C. (e.g., about 150° C. to 180° C.) is introduced into the slurry tank 30 to remove the hydrocarbon solvents, the solvent being removed by the overhead stream O. Temperatures in the slurry tank 30 can be in the range of 80° C. to 200° C. (e.g., 90° C. to 120° C.). The temperature of the components in the slurry tank 30, including the polymer in the formed slurry, can be dependent on the amount and temperature of the steam S mixed with the neutralized effluent stream NF to achieve removal of the hydrocarbon solvent. The polymer temperature can be in the range of 100° C. to 175° C.

The slurry tank overhead stream O may be sent to a separator wherein the hydrocarbon solvent can be separated from any water contained in the overhead stream; the recovered hydrocarbon solvent can preferably be treated and recycled back into the polymerization or bromination process. Water recovered from the separator may be recycled back into the neutralization feed stream.

Following removal of the solvent via overhead stream O, the slurry tank effluent R can be a slurry mixture of water and precipitated brominated polymer, as well as residual components. The polymer slurry R enters an extrusion drying unit 40 for removal of the water and separation of a polymer product stream P.

In an embodiment, additives known in the art, including but not limited to epoxidized soybean oil (also referred to as ESBO) and calcium stearate, may be added during the drying step. ESBO may be added in the range of about 1 to about 2 parts per hundred resin (phr) in unit 40 during the drying step. Calcium stearate may be added to the cement to the neutralization unit 20, and/or may be added to the slurry tank 30 to help the polymer from sticking to the equipment and to control the rubber particle size in the water slurry, and/or may be added to unit 40 during the drying step. Referring to FIG. 1, in an embodiment, a particular Mooney stabilizer additive package may be added to the extrusion drying unit 40 via X5.

Figure 2:
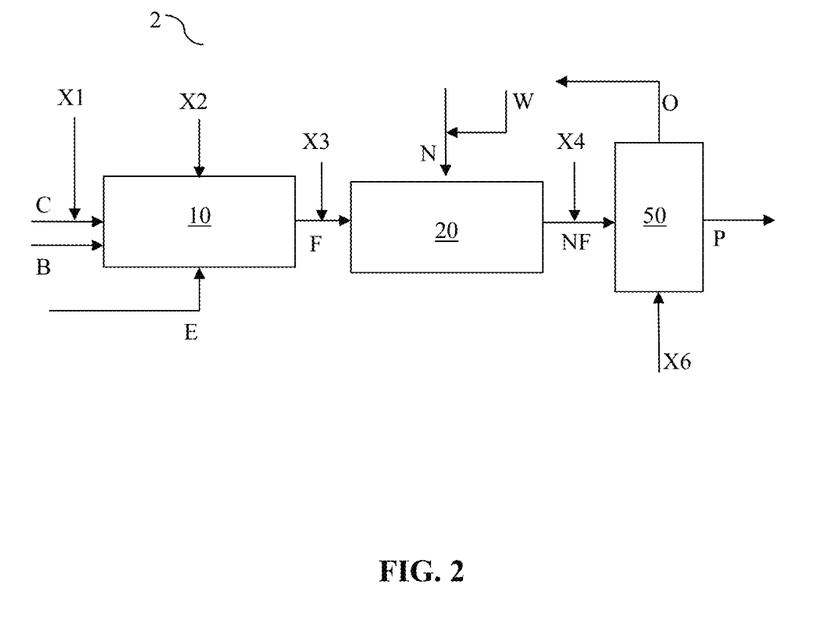

An alternative embodiment of the regenerative bromination process 2 is illustrated in FIG. 2. After the cement is neutralized in a neutralization unit 20, it is fed to a devolatizer unit 50 where solvent is removed by overhead stream O, separating polymer product stream P. In this embodiment, heat is provided as input to the devolatizer 50 via mechanical energy and/or surface heating via hot oil or any other heat transfer medium. In an embodiment, ESBO may be added to unit 50 of FIG. 2 and calcium stearate may be added to unit 20 and/or unit 50 of FIG. 2. Referring to FIG. 2, in an embodiment, a particular Mooney stabilizer additive package may be added to the devolatizer unit 50 via X6.

While not wishing to be bound to a single theory for the molecular weight/viscosity increase, it is believed that, during the regenerative bromination process, the elastomer may also be oxidized by the oxidizing agent and/or its oxygen-containing decomposition product. The active oxidative structures are typically very low in concentrations; one known resulting structure in the elastomer is an allylic alcohol, which may thus be present in the inventive compositions in an amount from about 0.001 mol % to about 0.2 mol %. When the polymer is subjected to a significant heat change, such as the slurry process following neutralization, the oxidized structures can decompose, creating polymeric free radicals. Unhindered, the radicals can generate in situ crosslinking of the polymer in sufficient quantity to observe/measure the increase (growth) in Mooney viscosity (and Mz and Mw, as well as skewing the MWD to higher molecular weights).

Mooney Stabilizers

To address the issue of generated polymeric free radicals during the bromine regenerative process, a stabilizer/antioxidant additive package (referred to herein as a "Mooney stabilizer additive package" or a "Mooney stabilizer additive," even if representing a combination of additives), can advantageously be incorporated into the polymer or polymer slurry, e.g., prior to the point of creation of free radicals or creation of an in situ crosslinked network. The Mooney stabilizer additive may be oil-/hydrocarbon-soluble, oil-/hydrocarbon-compatible, and/or water-compatible, with a preference for oil-/hydrocarbon-solubility and/or compatibility (e.g., hexane-soluble and/or hexane-compatible). It should be noted that solubility need not be measured strictly—if an additive visually disappears in a solvent/carrier, it can be considered dissolved. By extension, if an additive does not visually disappear in a solvent/carrier but is slurried or encapsulated in a solvent/carrier sufficiently to allow sufficient (relatively homogeneous) dispersion among/incorporation within the brominated elastomer slurry/solution, it can be considered compatible.

A suitable Mooney stabilizer additive (package) can comprise or consist essentially of (excluding the solvent/carrier) an amine-functional hindered amine stabilizer (HAS) and an acid scavenger. Hindered amine stabilizers (HAS) belong to a class of additives that can react with free radical species generated during polymer degradation/side reactions to form stable species. While certain Hindered amine stabilizers (HAS) (typically containing one or more triazine rings) can also stabilize compositions to side reactions from (UV) light (called hindered amine light stabilizers, or HALS), the focus for maintaining Mooney (oxidative) stability in brominated elastomers can be on a stabilizing moiety from a hindered ring nitrogen, such as a hindered piperidinyl nitrogen.

Hindered amine stabilizers (HAS) containing a piperidinyl nitrogen can include, but are not limited to, those according to formula (I) below.

In formula (I), the carbon at the para position to the piperidinyl nitrogen attaches to $R_1$, which can comprise an electron withdrawing moiety (such as a hydroxyl or an amine) or a linker connecting to one or more other moieties of formula (I) at a corresponding $R_1$ or at an $R_2$ of each other moiety. For example, the linker could be an ether oxygen connecting to a single other moiety of formula (I) at its corresponding $R_1$, an ether oxygen connecting to a single other moiety of formula (I) at its $R_2$, a $C_1$-$C_{24}$ heteroatom-containing hydrocarbon moiety connecting to one, two, or three other moieties of formula (I) at each corresponding $R_1$ or at each $R_2$, or a polymeric linker connecting multiple pendant groups of formula (I) and each corresponding $R_1$, at each $R_2$, or at one or more $R_1$'s and one or more $R_2$'s.

The two carbons at the ortho position to the piperidinyl nitrogen in formula (I) attach to $R_3$ and $R_4$ and to $R_5$ and $R_6$, respectively, which collectively represent the steric hindrance for the piperidinyl nitrogen. These four groups can collectively be bulky enough to block unfettered access to the (lone pair electrons of the) Lewis acidic piperidinyl nitrogen but not so bulky as to effectively eliminate the ability of the piperidinyl nitrogen to participate in oxidative reactions. For example, one or more of the following can create steric hindrance for the piperidinyl nitrogen: $R_3$ and $R_4$ can each independently be a $C_1$-$C_8$ hydrocarbon moiety; $R_5$ and $R_6$ can each independently be a $C_1$-$C_8$ hydrocarbon moiety; $R_3$ and $R_4$ can be connected to form a cyclic $C_5$-$C_{24}$ optionally heteroatom-containing hydrocarbon moiety; $R_5$ and $R_6$ can be connected to form a cyclic $C_5$-$C_{24}$ optionally heteroatom-containing hydrocarbon moiety; or one or both of $R_3$ and $R_6$ can be hydrogen and, to the ortho carbon(s) which has(have) a hydrogen attached, one or both of $R_4$ and $R_5$ can be a branched or cyclic $C_3$-$C_{18}$ optionally heteroatom-containing hydrocarbon moiety. In formula (I), the piperidinyl nitrogen can be attached to an $R_2$ group capable of being displaced during oxidative (e.g., free radical scavenging) reaction at the piperidinyl nitrogen. If $R_2$ is an optionally heteroatom-containing hydrocarbon ether, then the HAS is a sterically hindered nitroxyl ether (N—OR type HAS; a non-limiting example being Tinuvin® NOR 371, commercially available from BASF). If $R_2$ is an oxygen radical, then the HAS is a sterically hindered nitroxyl radical (N—O• type HAS; a non-limiting example being TEMPO). If $R_2$ is hydrogen, then the HAS is a sterically hindered secondary amine HAS (N—H type HAS; a non-limiting example being Chimassorb® 944, commercially available from BASF). If $R_2$ is an optionally heteroatom-containing hydrocarbon moiety, then the HAS is a sterically hindered tertiary amine HAS (N—R type HAS; a non-limiting example being Tinuvin® 622, commercially available from BASF). In any of these cases, $R_2$ can optionally also connect to an $R_1$ or $R_2$ moiety on one or more other piperidinyl rings.

Figure 3:
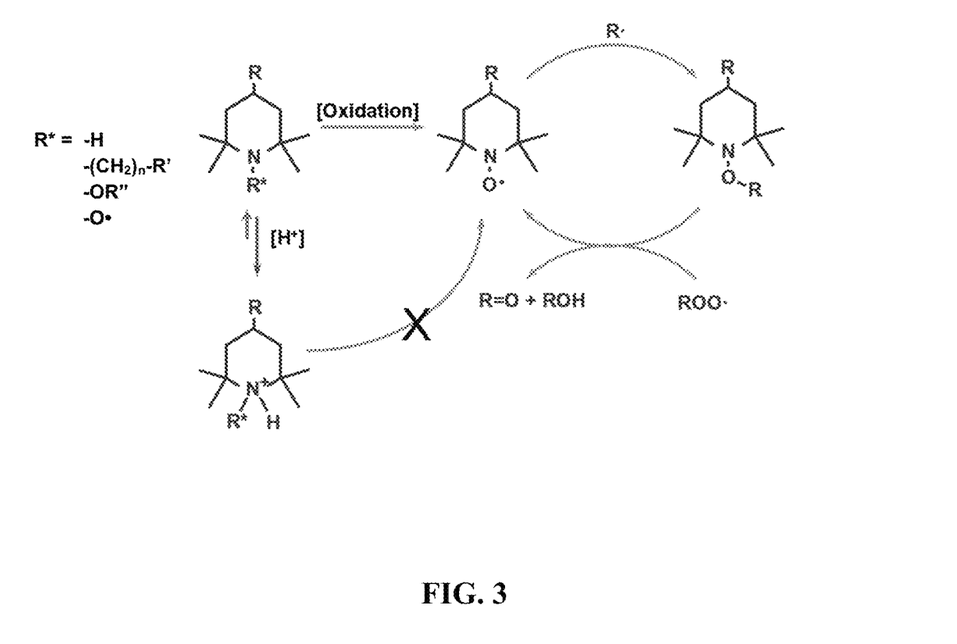
FIG. 3 shows a diagram explaining the free radical scavenging cycle for Hindered amine stabilizers (HAS) having a piperidinyl ring nitrogen.

FIG. 3 shows the free radical scavenging mechanism of Hindered amine stabilizers (HAS). N—O• type Hindered amine stabilizers (HAS) are already in the scavenging cycle, and N—OR type Hindered amine stabilizers (HAS) can enter the scavenging cycle rather quickly. N—H type and N—R type Hindered amine stabilizers (HAS) must first convert to a nitroxyl form (nitroxyl ether or nitroxyl radical) to enter the cycle. This normally requires an initial oxidation of the HAS to occur. Hindered amine stabilizers (HAS) whose ring nitrogen has been protonated/acidified (quaternized) cannot enter the scavenging cycle without deprotonating, which can require neutralizing the acid. N—OR type Hindered amine stabilizers (HAS) are typically relatively stable to acid and can therefore remain effective against oxidation even in acidic environments. However, N—H type and N—R type Hindered amine stabilizers (HAS) can be rather susceptible to protonation (formation of quaternary nitrogen) in acidic environments, in which the acidic form can be ineffective at providing oxidative (free radical scavenging) stability.

It is well known that brominated butyl elastomers can release HBr during storage, which can steadily increase the acidic environment (decrease the pH). It would be expected, therefore, for N—H type and N—R type Hindered amine stabilizers (HAS) to be ineffective at appreciable HBr concentrations (which can occur during even short storage times). It should be noted that less sterically hindered, or unhindered, secondary (corresponding to N—H type) and tertiary (corresponding to N—R type) substituted nitrogen atoms (amines) are believed to suffer from the same acid instability (protonation of the nitrogen in acidic conditions), leading to similar ineffectiveness in stabilizing against oxidation in such acidic environments as the N—H type and N—R type Hindered amine stabilizers (HAS). Nevertheless, perhaps counterintuitively and undoubtedly synergistically, an aspect of the present invention involves providing a Mooney stabilizer additive package comprising a combination of an N—H type and/or N—R type HAS with a secondary and/or tertiary amine. Without being bound by theory, it is believed that that the secondary and/or tertiary amine can act as an acid scavenger, thereby reducing the susceptibility of the concomitant N—H type and/or N—R type HAS to be oxidatively inactivated (by having its piperidinyl nitrogen protonated/quaternized).

The piperidinyl nitrogen of formula (I) can have a pKa that depends on the $R_2$ moiety linked thereto. In many embodiments, the piperidinyl nitrogen of formula (I) can have a pKa of less than 10, e.g., from about 5 to about 10. In order for the acid scavenger to effectively protect the N—H type and/or N—R type HAS from protonation (and thus from oxidative deactivation), the acid scavenger need only have a protonatable atom (a Lewis acid atom, such as a nitrogen atom) with a pKa greater than the pKa of the piperidinyl nitrogen of the particular N—H type and/or N—R type HAS being used (if multiple N—H type and/or N—R type Hindered amine stabilizers (HAS) are used, the acid scavenger should have a protonatable atom with a pKa greater than the highest pKa of any piperidinyl nitrogen atom in the combination of Hindered amine stabilizers (HAS)). Again, without being bound by theory, though secondary and/or tertiary amines are disclosed herein as appropriate acid scavengers, it should be understood that acceptable acid scavengers according to the invention may include any compounds that have a pKa greater than the pKa of the piperidinyl nitrogen of the HAS being used. Therefore, in some embodiments, the acid scavenger (such as a secondary and/or tertiary amine) can have a protonatable atom (a Lewis acid atom, such as a nitrogen atom) with a pKa greater than the pKa of the piperidinyl nitrogen of the HAS, as well as a pKa of at least 5.5 (e.g., at least 6, at least 7, at least 8, at least 9, at least 9.5, at least 10, or at least 11). Though no upper limit is contemplated, an acid scavenger according to the invention should not have a protonatable atom (a Lewis acid atom, such as a nitrogen atom) with a pKa so high that it enables decomposition or inactivation of the HAS.

In some advantageous embodiments, the amine-functional HAS can comprise one or more compounds having a moiety with a piperidinyl nitrogen according to formula (I):

(I)

wherein: $R_1$ can be a hydroxyl or a heteroatom-containing linker connecting to one or more other moieties of formula (I) at a corresponding $R_1$ or at an $R_2$ of each other moiety; $R_2$ can be hydrogen, a $C_1$-$C_8$ optionally heteroatom-containing hydrocarbon moiety having a carbon atom single-bonded to the piperidinyl nitrogen, or a heteroatom-containing linker connecting to one or more other moieties of formula (I) at a corresponding $R_2$ or at an $R_1$ of each other moiety; and $R_3$, $R_4$, $R_5$, and $R_6$ can each independently be a $C_1$-$C_6$ hydrocarbon moiety. Additionally or alternatively, $R_1$ is a hydroxyl or a $C_2$-$C_{12}$ heteroatom-containing linker connecting to one or more other moieties of formula (I) at a corresponding $R_1$ or at an $R_2$ of each other moiety; $R_2$ is hydrogen or a $C_1$-$C_6$ optionally heteroatom-containing hydrocarbon moiety having a carbon atom single-bonded to the piperidinyl nitrogen; and $R_3$, $R_4$, $R_5$, and $R_6$ are independently a $C_1$-$C_4$ hydrocarbon moiety. Additionally or alternatively, $R_1$ is polymeric linker connecting to at least four other moieties of formula (I) at a corresponding $R_1$ or at an $R_2$ of each other moiety; $R_2$ is hydrogen or a $C_1$-$C_6$ optionally heteroatom-containing hydrocarbon moiety having a carbon atom single-bonded to the piperidinyl nitrogen; and $R_3$, $R_4$, $R_5$, and $R_6$ are independently a $C_1$-$C_4$ hydrocarbon moiety. Additionally or alternatively, $R_1$ is a $C_2$-$C_8$ heteroatom-containing linker connecting to one or more other moieties of formula (I) at a corresponding $R_1$ or at an $R_2$ of each other moiety; $R_2$ is hydrogen or a $C_1$-$C_4$ optionally heteroatom-containing hydrocarbon moiety having a carbon atom single-bonded to the piperidinyl nitrogen; and $R_3$, $R_4$, $R_5$, and $R_6$ are independently a $C_1$-$C_2$ hydrocarbon moiety. In a particular embodiment, the amine-functional HAS comprises 4-hydroxy-2,2,6,6-tetramethyl-1-piperidineethanol or an etherified or esterified dimer or polymer thereof with $R_1$ being a heteroatom-containing linker connecting to one or more other moieties of formula (I) at an $R_2$ of each other moiety.

In some alternative embodiments, the amine-functional HAS can comprise one or more compounds having a moiety with a piperidinyl nitrogen according to formula (I):

(I)

wherein: $R_1$ can be a hydroxyl, a $C_1$-Cis optionally heteroatom-containing hydrocarbon moiety, or an optionally heteroatom-containing linker connecting to one or more other moieties of formula (I) at a corresponding $R_1$ or at an $R_2$ of each other moiety; $R_2$ can be hydrogen, a $C_1$-$C_8$ optionally heteroatom-containing hydrocarbon moiety having a carbon atom single-bonded to the piperidinyl nitrogen, or a heteroatom-containing linker connecting to one or more other moieties of formula (I) at a corresponding $R_2$ or at an $R_1$ of each other moiety; $R_3$ and $R_6$ can each be hydrogen; and $R_4$ and $R_5$ can each independently be a $C_3$-$C_{10}$ optionally heteroatom-containing hydrocarbon moiety.

In some advantageous embodiments, the acid scavenger can be amine-functional and comprise one or more compounds having a formula: $NR_7R_8R_9$, wherein: $R_7$ and $R_8$ can each independently be a $C_2$-$C_{18}$ optionally heteroatom-containing hydrocarbon moiety; and $R_9$ can either be hydrogen or a $C_1$-$C_{18}$ optionally heteroatom-containing hydrocarbon moiety. Additionally or alternatively, $R_7$ and $R_8$ are each independently a $C_4$-$C_{14}$ optionally heteroatom-containing hydrocarbon moiety; and $R_9$ is either hydrogen or a $C_1$-$C_{12}$ optionally heteroatom-containing hydrocarbon moiety. Additionally or alternatively, $R_7$ and $R_8$ are each independently a $C_6$-$C_{10}$ hydrocarbon moiety; and $R_9$ is either hydrogen or a $C_1$-$C_{10}$ hydrocarbon moiety. In a particular embodiment, the amine-functional acid scavenger can comprise dioctylamine, dicyclohexylamine, didecylamine, tributylamine, trihexylamine, trioctylamine, or a combination thereof (e.g., including at least dioctylamine and/or trihexylamine).

In most embodiments, the total amount of Mooney stabilizer additive(s) to be added during the process of preparing the brominated elastomer can be at least about 100 wppm total, at least about 300 wppm total, at least about 500 wppm total, at least about 800 wppm total, at least about 1000 wppm total, at least about 1500 wppm total, at least about 2000 wppm total, at least about 2500 wppm total, at least about 3000 wppm total, or at least about 5000 wppm total, based on the weight of the brominated elastomer. Additionally or alternatively, the total amount of Mooney stabilizer additive(s) to be added during the process of preparing the brominated elastomer can be at most about 20000 wppm total, at most about 15000 wppm total, at most about 10000 wppm total, at most about 8000 wppm total, at most about 7000 wppm total, at most about 6000 wppm total, at most about 5000 wppm total, at most about 3000 wppm total, at most about 2500 wppm total, at most about 2000 wppm total, at most about 1500 wppm total, or at most about 1000 wppm total, based on the weight of the brominated elastomer. In particular embodiments, the total amount of Mooney stabilizer additive(s) to be added during the process of preparing the brominated elastomer can be from about 1000 wppm to about 7000 wppm, from about 1500 wppm to about 6000 wppm, or from about 2500 wppm to about 5000 wppm.

In most embodiments, the weight ratio of amine-functional HAS, relative to acid scavenger, to be added during the process of preparing the brominated elastomer can be at least about 1:10, at least about 1:8, at least about 1:6, at least about 1:5, at least about 1:4, at least about 1:3, at least about 2:5, at least about 1:2, at least about 4:7, at least about 2:3, at least about 4:5, at least about 1:1, at least about 5:4, at least about 3:2, at least about 7:4, at least about 2:1, at least about 3:1, or at least about 4:1. Additionally or alternatively, the weight ratio of amine-functional HAS, relative to acid scavenger, to be added during the process of preparing the brominated elastomer can be at most about 20:1, at most about 15:1, at most about 10:1, at most about 8:1, at most about 6:1, at most about 5:1, at most about 4:1, at most about 3:1, at most about 5:2, at most about 2:1, at most about 7:4, at most about 3:2, at most about 5:4, at most about 1:1, at most about 5:4, at most about 2:3, at most about 4:7, or at most about 1:2. In particular embodiments, the weight ratio of amine-functional HAS, relative to acid scavenger, to be added during the process of preparing the brominated elastomer can be from about 2:3 to about 6:1, from about 1:1 to about 8:1, from about 1:2 to about 4:1, or from about 4:5 to about 5:1.

In most embodiments, the amount of amine-functional HAS to be added during the process of preparing the brominated elastomer can be at least about 100 wppm, at least about 300 wppm, at least about 500 wppm, at least about 800 wppm, at least about 1000 wppm, at least about 1500 wppm, at least about 2000 wppm, at least about 2500 wppm, at least about 3000 wppm, or at least about 5000 wppm, based on the weight of the brominated elastomer. Additionally or alternatively, the amount of amine-functional HAS to be added during the process of preparing the brominated elastomer can be at most about 7500 wppm, at most about 6000 wppm, at most about 5000 wppm, at most about 3000 wppm, at most about 2500 wppm, at most about 2000 wppm, at most about 1500 wppm, at most about 1000 wppm, at most about 800 wppm, or at most about 500 wppm, based on the weight of the brominated elastomer. In particular embodiments, the amount of amine-functional HAS to be added during the process of preparing the brominated elastomer can be at least about 500 wppm, from about 300 wppm to about 3000 wppm, from about 500 wppm to about 2500 wppm, or from about 500 wppm to about 2000 wppm.

In most embodiments, the amount of (amine-functional) acid scavenger to be added during the process of preparing the brominated elastomer can be at least about 100 wppm, at least about 300 wppm, at least about 500 wppm, at least about 800 wppm, at least about 1000 wppm, at least about 1500 wppm, at least about 2000 wppm, at least about 2500 wppm, at least about 3000 wppm, or at least about 5000 wppm, based on the weight of the brominated elastomer. Additionally or alternatively, the amount of (amine-functional) acid scavenger to be added during the process of preparing the brominated elastomer can be at most about 15000 wppm, at most about 10000 wppm, at most about 7000 wppm, at most about 5000 wppm, at most about 4000 wppm, at most about 3000 wppm, at most about 2500 wppm, at most about 2000 wppm, at most about 1500 wppm, at most about 1000 wppm, at most about 800 wppm, or at most about 500 wppm, based on the weight of the brominated elastomer. In particular embodiments, the amount of (amine-functional) acid scavenger to be added during the process of preparing the brominated elastomer can be at least about 500 wppm, at least about 800 wppm, at least about 1000 wppm, from about 500 wppm to about 7000 wppm, from about 800 wppm to about 5000 wppm, or from about 1000 wppm to about 4000 wppm.

In some embodiments, at least about 300 wppm (particularly at least about 500 wppm, from about 300 wppm to about 3000 wppm, from about 500 wppm to about 2500 wppm, or from about 500 wppm to about 2000 wppm) of amine-functional HAS and at least about 500 wppm (particularly at least about 800 wppm, at least about 1000 wppm, from about 500 wppm to about 7000 wppm, from about 800 wppm to about 5000 wppm, or from about 1000 wppm to about 4000 wppm) of (amine-functional) acid scavenger can be added during the process of preparing the brominated elastomer.

Referring to FIGS. 1 and 2, in some embodiment, one, some, or all components of the Mooney stabilizer additive package can be added via cement stream C. Additionally or alternatively, one, some, or all components of the Mooney stabilizer additive package can be added to the bromination unit 10 via stream X2. Further, additionally or alternatively, one, some, or all components of the Mooney stabilizer additive package can be added to the stream F via X3 before the effluent from the bromination unit 10 has been neutralized by stream N. Still further, additionally or alternatively, one, some, or all components of the Mooney stabilizer additive package can be added to the neutralization unit 20. Yet further, additionally or alternatively, one, some, or all components of the Mooney stabilizer additive package can be added to the stream NF via X4 after the neutralization unit 20.

In some embodiments, one, some, or all components of the Mooney stabilizer additive package may be added in more than one location in the halogenation process, provided at least a portion of the Mooney stabilizer additive package is added prior to a step involving a significant heat change. When one, some, or all components of the Mooney stabilizer additive package are added before or during neutralization, residency time in the process may provide time for the stabilizer components to collectively counter any oxidized structures and/or polymeric free radicals. One, some, or all components of the Mooney stabilizer additive package may be added: to the stream C, to the bromination unit 10, to the bromination effluent F prior to neutralization, to unit 20 during neutralization, after neutralization NF, to the extrusion drying unit 40, to the devolatizer unit 50, or to any combination thereof.

Resulting Elastomer Compositions

Some aspects of the invention involve stabilized brominated elastomer compositions, whether simply containing the Mooney viscosity growth stabilizer additive package as added or containing an activated/oxidized/reacted form of the added Mooney viscosity growth stabilizer additive package. In some embodiments, the stabilized brominated elastomer composition can comprise: a copolymer made from a $C_4$ to $C_7$ isomonoolefin and at least one monomer or polymerizable unit selected from the group consisting of isoprene and alkylstyrene; and a Mooney stabilizer additive comprising (or consisting essentially of) an amine-functional hindered amine stabilizer (HAS) and an acid scavenger. In these embodiments, the amine-functional HAS can comprise a HAS nitrogen atom having a first pKa and the acid scavenger can advantageously comprise a protonatable atom with a pKa greater than the pKa of the HAS nitrogen atom. In preferable embodiments, the protonatable atom can be a Lewis acid atom, such as a nitrogen atom (in which case the acid scavenger can, in most embodiments, be an amine-functional acid scavenger). In some embodiments, the brominated elastomer composition can be oxidatively-stable even in activated/oxidized/reacted form, thus comprising: a copolymer made from a $C_4$ to $C_7$ isomonoolefin and at least one monomer or polymerizable unit selected from the group consisting of isoprene and alkylstyrene; and an oxidized Mooney stabilizer additive comprising an oxidized nitroxy-functional HAS (i.e., the activated/oxidized/reacted form of the added amine-functional HAS) and an acidified quaternary ammonium (i.e., the protonated/acidified form of the amine-functional acid scavenger).

In these embodiments, the (stabilized) brominated elastomer composition can advantageously exhibit an initial Mooney viscosity no more than about 12 Mooney units lower (e.g., no more than about 10 Mooney units lower, no more than about 8 Mooney units lower, or no more than about 6 Mooney units lower) than an aged Mooney viscosity after being subject to about 80° C. for about 12 days (e.g., for about 10 days, for about 8 days, for about 7 days, for about 6 days, for about 5 days, or for about 4 days). Additionally or alternatively, the (stabilized) brominated elastomer composition can exhibit an initial Mooney viscosity no more than about 12 Mooney units lower (e.g., no more than about 10 Mooney units lower, no more than about 8 Mooney units lower, or no more than about 6 Mooney units lower) than an aged Mooney viscosity after being subject to about 33° C. for about 3 years (e.g., for about 2.5 years, for about 2 years, for about 21 months, for about 18 months, for about 15 months, or for about 1 year). Further, additionally or alternatively, the (stabilized) brominated elastomer composition can exhibit an initial Mooney viscosity at least about 1 Mooney unit lower (e.g., at least about 2 Mooney units lower, at least about 3 Mooney units lower, at least about 4 Mooney units lower, at least about 5 Mooney units lower, or at least about 6 Mooney units lower) than an aged Mooney viscosity after being subject to about 80° C. for about 10 days (e.g., for about 8 days, for about 7 days, for about 6 days, for about 5 days, or for about 4 days). Still further, additionally or alternatively, the (stabilized) brominated elastomer composition can exhibit an initial Mooney viscosity at least about 1 Mooney unit lower (e.g., at least about 2 Mooney units lower, at least about 3 Mooney units lower, at least about 4 Mooney units lower, at least about 5 Mooney units lower, or at least about 6 Mooney units lower) than an aged Mooney viscosity after being subject to about 33° C. for about 3 years (e.g., for about 2.5 years, for about 2 years, for about 21 months, for about 18 months, for about 15 months, or for about 1 year). In particular embodiments, the (stabilized) brominated elastomer composition can exhibit a delta Mooney viscosity after being subject to about 80° C. for about 7 days of no more than 10 Mooney units, no more than 8 Mooney units, from about 2 Mooney units to about 12 Mooney units, from about 3 Mooney units to about 10 Mooney units, or from about 1 Mooney unit to about 8 Mooney units.

Additionally or alternatively, in these embodiments, particularly where oxidation has begun to affect the polymeric structure, the stabilized brominated elastomer compositions can comprise from about 0.001 mol % to about 0.2 mol % of an allylic alcohol.

INDUSTRIAL APPLICABILITY

The brominated elastomer compositions disclosed herein can be used to make any number of articles. In certain embodiments, the article is selected from tire curing bladders, tire innerliners, tire innertubes, and air sleeves. In some embodiments, the article is a hose or a hose component in multilayer hoses, such as those that contain polyamide as one of the component layers. Other useful goods that can additionally or alternatively be made using polymers of the invention include air spring bladders, seals, molded goods, cable housing, rubber-based pharmaceutical stoppers, and other articles disclosed in THE VANDERBILT RUBBER HANDBOOK, PP. 637-772 (Ohm, ed., R.T. Vanderbilt Company, Inc., 1990).

All priority documents, patents, publications, and patent applications, test procedures (such as ASTM methods), and other documents cited herein are fully incorporated by reference to the extent such disclosure is not inconsistent with this invention and for all jurisdictions in which such incorporation is permitted.

Certain embodiments and features have been described using a set of numerical upper limits and a set of numerical lower limits. It should be appreciated that, within a single characterization, ranges spanning from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

EXAMPLES

Example 1

Example 1 shows the efficacy of the Mooney stabilizer package according to the invention with regard to inhibiting Mooney viscosity growth in brominated butyl elastomers made by a regenerative bromination process. In Example 1, a commercial synthesis process was simulated by re-slurrying 100 g of dry rubber base a previously-made brominated butyl elastomer in hexane, after which a slurry/solution of a Mooney stabilizer package in hexane (or of just hexane, for a negative control) was added thereto for incorporation. In this simulated commercial process, a brominated butyl rubber (with additive incorporated) was isolated from the (re-)slurry by treating with a lab steam stripper at 95 to 100° C. for 1 hr for removing the solvent (e.g., hexane) and then with a Brabender™ mixer at 110 to 125° C. for 10 min for drying/removing moisture.

Initial Mooney viscosities were measured on brominated butyl elastomer samples within an hour after being isolated or after storing the brominated butyl elastomer samples for 90 days or less at about 25° C. Aged Mooney viscosities were measured on isolated brominated butyl elastomer samples after exposure in an oven to a temperature of about 80° C. for about 7 days (simulation of lengthy storage condition accelerated by using higher-than-ambient temperature).

The Mooney stabilizer package was varied in this Example, in order to show the efficacy of the inventive combination in inhibiting Mooney viscosity growth upon aging. Sample A was the control sample, with no stabilizer package being added to the base slurry of brominated butyl elastomer. Sample B was the base slurry of brominated butyl elastomer plus about 1000 wppm of butylated hydroxytoluene (BHT) in hexane as the sole stabilizer. Samples C and D were the base slurry of brominated butyl elastomer plus about 2000 wppm or about 1000 wppm, respectively, of Tinuvin® NOR 371 (a sterically hindered polyfunctional nitroxyl ether, commercially available from BASF) in hexane as the sole stabilizer. Samples E and F were the base slurry of brominated butyl elastomer plus a combination of about 2000 wppm of dioctylamine (acid scavenger) and about 1000 wppm or about 500 wppm, respectively, of Tinuvin® NOR 371 in hexane as the dual stabilizers. Sample G was the base slurry of brominated butyl elastomer plus about 1000 wppm of Tinuvin® 622 (a sterically hindered polyfunctional amine HAS, commercially available from BASF) in hexane as the sole stabilizer. Sample H was the base slurry of brominated butyl elastomer plus a combination of about 2000 wppm of dioctylamine (acid scavenger) and about 1000 wppm of Tinuvin® 622 in hexane as the dual stabilizer.

Samples B, C, and D are comparative, showing the effect of previously disclosed hindered phenolic and hindered nitroxyl ether stabilizers. Samples E and F show the effect of the combination of hindered nitroxyl ethers and an acid scavenger as a stabilizer package. Sample G shows the effect of the amine HAS (tertiary piperidinyl amine) alone as a stabilizer. And Sample H shows the effect of the inventive combination of amine HAS (tertiary piperidinyl amine) and acid scavenger (secondary or tertiary amine) as a stabilizer package.

Figure 4:
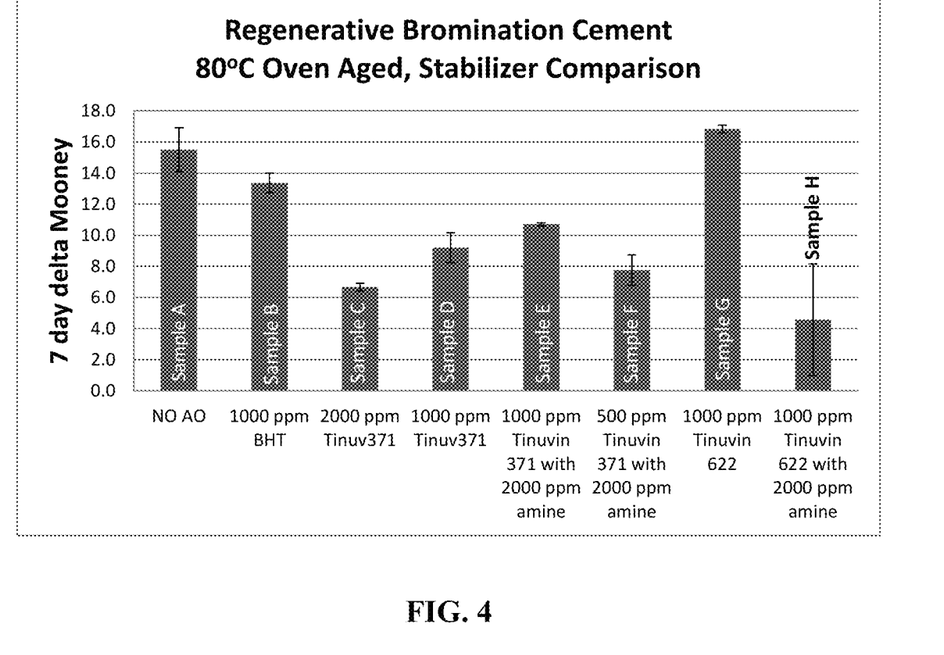
FIG. 4 shows Mooney viscosity growth in regenerative brominated cements with a variety of Mooney stabilizer additives, based on an accelerated oxidation test.

FIG. 4 shows graphically the results of the ~7-day/~80° C. delta Mooney for each Sample. Mooney viscosity growth can best be seen in the absence of stabilizers, e.g., for Sample A, which shows an increase of approximately 15 Mooney units on aging. The hindered phenolic stabilizer alone (Sample B) only inhibits Mooney viscosity growth by about 10%, relative to no stabilizer (Sample A). The hindered nitroxyl ether stabilizers alone (Samples C-D) show significant inhibition of Mooney viscosity growth (~35-60%, relative to no stabilizer). The combinations of the hindered nitroxyl ether and the acid scavenger as stabilizers (Samples E-F) also show inhibition of Mooney viscosity growth (~30-50%, relative to no stabilizer), but show no improvement, and perhaps even a slight detriment, when compared to the hindered nitroxyl ethers alone (Samples C-D). The (tertiary piperidinyl) amine HAS alone (Sample G) showed no inhibition of Mooney viscosity growth by itself (or even a small detriment), relative to no stabilizer. However, the combination of the (tertiary piperidinyl) amine HAS and the (secondary/tertiary amine) acid scavenger (Sample H) showed a significant inhibition of Mooney viscosity growth (~70%, relative to either no stabilizer or to the amine HAS alone).

Example 2

In Example 1, the amine HAS was tested alone as a Mooney stabilizer to show its efficacy (or lack thereof) and the acid scavenger was tested in combination with the hindered nitroxyl ether to show its additional efficacy (or lack thereof), but Example 1 did not include an experiment showing the effect of the acid scavenger alone. As a result, a supplemental test was run in Example 2 to show just that.

However, instead of using the Example 1 method of re-slurrying and re-isolating, the Example 2 experiment involved the use of 100 g crumbs of a previously-made brominated butyl elastomer according to Example 1.

Sample J was the control sample, with no stabilizer package being added to the base brominated butyl elastomer crumbs—similar to Sample A from Example 1. Sample K was the base brominated butyl elastomer crumbs plus about 2000 wppm of Tinuvin® NOR 371 (a sterically hindered polyfunctional nitroxyl ether, commercially available from BASF) in hexane as the sole stabilizer. Sample L was the base brominated butyl elastomer crumbs plus about 2000 wppm of dioctylamine (acid scavenger) in hexane as the sole stabilizer.

Figure 5:
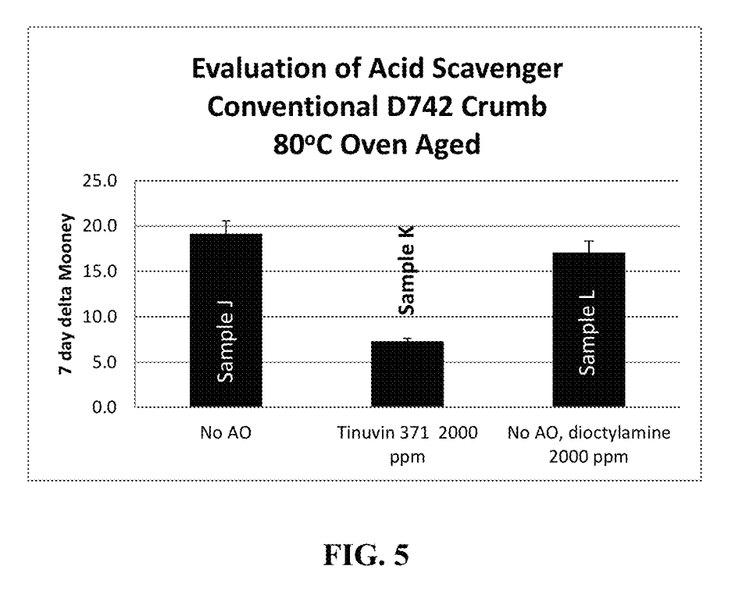
FIG. 5 shows Mooney viscosity growth in regenerative brominated cements with a variety of Mooney stabilizer additives, based on a different accelerated oxidation test than in FIG. 4.

FIG. 5 shows graphically the results of the ~7-day/~80° C. delta Mooney for each Sample. Mooney viscosity growth can again be seen in the absence of stabilizers, e.g., for Sample J, which shows an increase of approximately 19 Mooney units on aging in this test. The hindered nitroxyl ether stabilizer alone (Sample K) again showed significant inhibition of Mooney viscosity growth (~60%, relative to no stabilizer). The acid scavenger alone (Sample L), however, showed little inhibition of Mooney viscosity growth relative to no stabilizer-only about 10%, which was similar to the result for the hindered phenolic stabilizer alone (Sample B from Example 1).

Based on the combination of Examples 1 and 2, it can be seen that the amine HAS stabilizer alone and the acid scavenger stabilizer alone did not provide a significant or appreciable stabilizing effect/inhibition of Mooney viscosity growth. However, it appeared that the combination of the amine HAS and the acid scavenger together provided a synergistically large stabilizing effect/inhibition of Mooney viscosity growth for the brominated butyl elastomer, in accelerated testing. It is therefore believed, without being bound by theory, that this inhibition of Mooney viscosity growth in accelerated testing (i.e., at ~80° C. for ~7 days) corresponds to an inhibition of Mooney viscosity growth for a much longer storage time at more practical storage conditions (e.g., at ~33° C. for ~21 months). Such a correlation should imply an extrapolation of Mooney viscosity growth inhibition, thereby allowing storage of brominated butyl elastomer commercial product under standard storage conditions for as long as ~2 years or ~30 months while retaining an acceptable Mooney viscosity.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of improving Mooney stability of a brominated elastomer, the method comprising:
    neutralizing a brominated elastomer effluent with a neutralizing agent and water to form a neutralized effluent comprising a hydrocarbon solvent;
    removing the hydrocarbon solvent from the neutralized effluent to form a brominated elastomer slurry; and
    separating a brominated elastomer from the brominated elastomer slurry,
    wherein an amine-functional hindered amine stabilizer (HAS) and an acid scavenger are added i) to the brominated elastomer effluent prior to neutralizing, ii) when neutralizing the brominated elastomer effluent, or iii) to the neutralized effluent prior to removing the hydrocarbon solvent, together or separately, and
    wherein the amine-functional HAS comprises a HAS nitrogen atom having a first pKa and the acid scavenger comprises a protonatable atom with a pKa greater than the pKa of the HAS nitrogen atom.

2. The method of claim 1, wherein the separated brominated elastomer has an aged Mooney viscosity of not more than about 10 Mooney units higher than an initial Mooney viscosity of the separated brominated elastomer.

3. The method of claim 1, wherein the acid scavenger is an amine-functional acid scavenger such that the protonatable atom is a nitrogen atom, and wherein at least about 500 wppm of amine-functional HAS and at least about 1000 wppm of amine-functional acid scavenger are added.

4. The method of claim 1, wherein the amine-functional HAS comprises one or more compounds having a moiety with a piperidinyl nitrogen according to formula (I):

wherein:
- $R_1$ is a hydroxyl or a heteroatom-containing linker connecting to one or more other moieties of formula (I) at a corresponding $R_1$ or at an $R_2$ of each other moiety;
- $R_2$ is hydrogen, a $C_1$-$C_8$ optionally heteroatom-containing hydrocarbon moiety having a carbon atom single-bonded to the piperidinyl nitrogen, or is a heteroatom-containing linker connecting to one or more other moieties of formula (I) at a corresponding $R_2$ or at an $R_1$ of each other moiety; and
- $R_3$, $R_4$, $R_5$, and $R_6$ are independently a $C_1$-$C_6$ hydrocarbon moiety.

5. The method of claim 4, wherein the amine-functional HAS comprises 4-hydroxy-2,2,6,6-tetramethyl-1-piperidineethanol or an esterified dimer or polymer thereof with $R_1$ being connected as a heteroatom-containing linker to another moiety of formula (I) at an $R_2$ of the other moiety.

6. The method of claim 1, wherein the amine-functional HAS comprises one or more compounds having a moiety with a piperidinyl nitrogen according to formula (I):

wherein:
- $R_1$ is a hydroxyl, a $C_1$-$C_{18}$ optionally heteroatom-containing hydrocarbon moiety, or an optionally heteroatom-containing linker connecting to one or more other moieties of formula (I) at a corresponding $R_1$ or at an $R_2$ of each other moiety;
- $R_2$ is hydrogen, a $C_1$-$C_8$ optionally heteroatom-containing hydrocarbon moiety having a carbon atom single-bonded to the piperidinyl nitrogen, or is a heteroatom-containing linker connecting to one or more other moieties of formula (I) at a corresponding $R_2$ or at an $R_1$ of each other moiety;
- $R_3$ and $R_6$ are each hydrogen; and
- $R_4$ and $R_5$ are each independently a $C_3$-$C_{10}$ optionally heteroatom-containing hydrocarbon moiety.

7. The method of claim 1, wherein the acid scavenger is an amine-functional acid scavenger such that the protonatable atom is a nitrogen atom, and wherein the amine-functional acid scavenger comprises one or more compounds having a formula:
$NR_7R_8R_9$, wherein:
- $R_7$ and $R_8$ are each independently a $C_2$-$C_{18}$ optionally heteroatom-containing hydrocarbon moiety; and
- $R_9$ is either hydrogen or a $C_1$-$C_{18}$ optionally heteroatom-containing hydrocarbon moiety.

8. The method of claim 7, wherein the amine-functional acid scavenger comprises dioctylamine.

9. The method of claim 1, wherein the solvent comprises pentane, hexane, heptane, cyclohexane, cyclopentane, mono-, di-, or tri-halogenated $C_1$-$C_6$ paraffinic hydrocarbon, or a combination thereof.

10. A brominated elastomer prepared by the method of claim 1.

11. An article comprising the brominated elastomer of claim 10, wherein the article is a tire innerliner or a tire bladder or is incorporated as a layer into a tire, a bladder, a hose, a belt, a pneumatic spring, or a vehicle body mount.

12. A brominated elastomer composition comprising:
- a copolymer made from a $C_4$ to $C_7$ isomonoolefin and at least one monomer or polymerizable unit selected from isoprene and alkylstyrene; and
- a Mooney stabilizer comprising an amine-functional hindered amine stabilizer (HAS) and an acid scavenger,
- wherein the brominated elastomer composition has an initial Mooney viscosity of no more than about 10 Mooney units lower than an aged Mooney viscosity after being subject to 80° C. for seven days.

13. The brominated elastomer composition of claim 12, wherein the acid scavenger is an amine-functional acid scavenger such that the protonatable atom is a nitrogen atom.

14. The brominated elastomer composition of claim 12, wherein the Mooney stabilizer additive consists essentially of the amine-functional hindered amine stabilizer (HAS) and the amine-functional acid scavenger.

15. The brominated elastomer composition of claim 12, further comprising 0.001 to 0.2 mol % of an allylic alcohol.

16. An oxidatively-stable brominated elastomer composition comprising:
- a copolymer made from a $C_4$ to $C_7$ isomonoolefin and at least one monomer or polymerizable unit selected from isoprene and alkylstyrene; and
- an oxidized Mooney stabilizer additive comprising an oxidized nitroxy-functional hindered amine stabilizer (HAS) and an acidified quaternary ammonium,
- wherein the brominated elastomer composition has an initial Mooney viscosity of no more than about 10 Mooney units lower than an aged Mooney viscosity after being subject to 80° C. for 7 days.

17. The brominated elastomer composition of claim 16, further comprising 0.001 to 0.2 mol % of an allylic alcohol.

* * * * *